United States Patent
Karczewicz et al.

(10) Patent No.: US 9,516,316 B2
(45) Date of Patent: Dec. 6, 2016

(54) VLC COEFFICIENT CODING FOR LARGE CHROMA BLOCK

(75) Inventors: Marta Karczewicz, San Diego, CA (US); Xianglin Wang, San Diego, CA (US); Wei-Jung Chien, San Diego, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 13/535,536

(22) Filed: Jun. 28, 2012

(65) Prior Publication Data

US 2013/0114669 A1    May 9, 2013

Related U.S. Application Data

(60) Provisional application No. 61/502,794, filed on Jun. 29, 2011, provisional application No. 61/552,346, filed on Oct. 27, 2011.

(51) Int. Cl.
  *H04N 19/61* (2014.01)
  *H04N 19/91* (2014.01)
  (Continued)

(52) U.S. Cl.
  CPC ........ *H04N 19/00951* (2013.01); *H04N 19/13* (2014.11); *H04N 19/176* (2014.11);
  (Continued)

(58) Field of Classification Search
  CPC ......... H04N 7/50; H04N 7/26244; H04N 7/12
  (Continued)

(56) References Cited

U.S. PATENT DOCUMENTS

| 5,227,878 A | 7/1993 | Puri et al. |
| 5,253,055 A | 10/1993 | Civanlar et al. |

(Continued)

FOREIGN PATENT DOCUMENTS

| EP | 1424856 A1 | 6/2004 |
| EP | 1553779 A1 | 7/2005 |

(Continued)

OTHER PUBLICATIONS

Karczewicz et al., "CE5: coefficient coding with LCEC for large block", 96. MPEG Meeting; Mar. 21, 2011-Mar. 25, 2011; Geneva; (Motion Picture Expert Group or ISO/IEC JTC1/SC29/WG11), No. m19915, Mar. 20, 2011.*

(Continued)

*Primary Examiner* — Jorge L Ortiz Criado
*Assistant Examiner* — Daniel Chang
(74) *Attorney, Agent, or Firm* — Shumaker & Sieffert, P.A.

(57) ABSTRACT

This disclosure describes techniques for coding transform coefficients for a block of video data. According to these techniques, a video coder (a video encoder or video decoder) determines whether a block of video data is a luma block or a chroma block. If the block of video data is a luma block, the video coder adaptively updates a VLC table index value based on a code number cn and value of a scaling factor. However, if the block of video data is a chroma block, the video coder adaptively updates the VLC table index value based on the code number cn and without using the scaling factor. The video coder uses the updated VLC table index value to select a VLC table of a plurality of VLC tables that are used to encode or decode the block of video data.

18 Claims, 5 Drawing Sheets

(51) Int. Cl.
*H04N 19/176* (2014.01)
*H04N 19/13* (2014.01)
*H04N 19/60* (2014.01)
*H04N 19/186* (2014.01)

(52) U.S. Cl.
CPC ........... *H04N 19/186* (2014.11); *H04N 19/60* (2014.11); *H04N 19/61* (2014.11); *H04N 19/91* (2014.11)

(58) Field of Classification Search
USPC .......................... 375/240.02, 240.24, 240.22
See application file for complete search history.

(56) References Cited

U.S. PATENT DOCUMENTS

| | | | |
|---|---|---|---|
| 5,600,812 | A | 2/1997 | Park |
| 5,701,164 | A | 12/1997 | Kato |
| 5,821,887 | A | 10/1998 | Zhu |
| 5,999,111 | A | 12/1999 | Park et al. |
| 6,014,095 | A | 1/2000 | Yokoyama |
| 6,219,457 | B1 | 4/2001 | Potu |
| 6,243,421 | B1 | 6/2001 | Nakajima et al. |
| 6,646,578 | B1 | 11/2003 | Au |
| 6,696,993 | B2 | 2/2004 | Karczewicz |
| 6,771,193 | B2 | 8/2004 | Craft |
| 6,795,584 | B2 | 9/2004 | Karczewicz et al. |
| 7,394,942 | B2 | 7/2008 | Chen et al. |
| 7,680,349 | B2 | 3/2010 | Chen et al. |
| 7,702,013 | B2 | 4/2010 | Schwarz et al. |
| 7,800,520 | B2 | 9/2010 | Lin et al. |
| 7,843,998 | B2 | 11/2010 | Bjontegaard |
| 7,920,629 | B2 | 4/2011 | Bjontegaard et al. |
| 8,350,735 | B2 | 1/2013 | Hallapuro et al. |
| 8,401,082 | B2 | 3/2013 | Ye et al. |
| 8,446,301 | B2 | 5/2013 | He et al. |
| 8,502,709 | B2 | 8/2013 | Jia |
| 2003/0081850 | A1 | 5/2003 | Karczewicz et al. |
| 2003/0202601 | A1* | 10/2003 | Bjontegaard et al. ... H04N 7/12 375/240.22 |
| 2004/0021592 | A1 | 2/2004 | Karczewicz |
| 2004/0233076 | A1 | 11/2004 | Zhou |
| 2004/0234144 | A1 | 11/2004 | Sugimoto et al. |
| 2006/0146936 | A1 | 7/2006 | Srinivasan |
| 2007/0036223 | A1 | 2/2007 | Srinivasan |
| 2007/0064937 | A1 | 3/2007 | Van Leest et al. |
| 2007/0139236 | A1 | 6/2007 | Shastry et al. |
| 2007/0200737 | A1 | 8/2007 | Gao et al. |
| 2008/0002767 | A1 | 1/2008 | Schwarz et al. |
| 2008/0013633 | A1* | 1/2008 | Ye et al. .................. 375/240.24 |
| 2008/0063083 | A1 | 3/2008 | Kondo et al. |
| 2008/0089422 | A1 | 4/2008 | Karczewicz |
| 2008/0089424 | A1 | 4/2008 | Karczewicz et al. |
| 2008/0130507 | A1 | 6/2008 | Kwon |
| 2008/0130512 | A1 | 6/2008 | Park et al. |
| 2008/0165036 | A1 | 7/2008 | Shima |
| 2008/0165858 | A1 | 7/2008 | Karczewicz et al. |
| 2008/0209180 | A1 | 8/2008 | Lee |
| 2008/0253443 | A1 | 10/2008 | Mittal et al. |
| 2008/0310504 | A1 | 12/2008 | Ye et al. |
| 2008/0310745 | A1 | 12/2008 | Ye et al. |
| 2009/0016440 | A1 | 1/2009 | Tian et al. |
| 2009/0086815 | A1 | 4/2009 | Tian et al. |
| 2009/0110070 | A1 | 4/2009 | Takahashi et al. |
| 2009/0154820 | A1 | 6/2009 | Li et al. |
| 2009/0161974 | A1 | 6/2009 | Bjontegaard et al. |
| 2009/0226103 | A1 | 9/2009 | Choi et al. |
| 2009/0228601 | A1 | 9/2009 | Tseng et al. |
| 2009/0232204 | A1 | 9/2009 | Lee et al. |
| 2010/0020867 | A1 | 1/2010 | Wiegand et al. |
| 2010/0046626 | A1 | 2/2010 | Tu et al. |
| 2010/0135384 | A1 | 6/2010 | Berkvens et al. |
| 2010/0150226 | A1 | 6/2010 | Hallapuro et al. |
| 2010/0290533 | A1 | 11/2010 | Minagawa |
| 2011/0169670 | A1 | 7/2011 | Gou et al. |
| 2011/0182361 | A1 | 7/2011 | Nakamura et al. |
| 2011/0206135 | A1 | 8/2011 | Drugeon et al. |
| 2011/0211636 | A1 | 9/2011 | Yamada et al. |
| 2011/0280314 | A1 | 11/2011 | Sankaran et al. |
| 2012/0020408 | A1 | 1/2012 | Chen et al. |
| 2012/0082230 | A1 | 4/2012 | Karczewicz et al. |
| 2012/0163471 | A1 | 6/2012 | Karczewicz et al. |
| 2012/0170662 | A1 | 7/2012 | Karczewicz et al. |
| 2012/0224628 | A1 | 9/2012 | Seo et al. |
| 2012/0236931 | A1 | 9/2012 | Karczewicz et al. |
| 2013/0010860 | A1 | 1/2013 | Tian et al. |
| 2013/0089138 | A1 | 4/2013 | Guo et al. |
| 2013/0114734 | A1 | 5/2013 | Karczewicz et al. |

FOREIGN PATENT DOCUMENTS

| | | |
|---|---|---|
| EP | 1679903 A2 | 7/2006 |
| EP | 2182732 A1 | 5/2010 |
| JP | 2000134495 A | 5/2000 |
| JP | 2008048098 A | 2/2008 |
| TW | 201028010 A | 7/2010 |
| WO | WO9800807 A1 | 1/1998 |
| WO | 9836574 A1 | 8/1998 |
| WO | WO03027940 A1 | 4/2003 |
| WO | WO03063501 A1 | 7/2003 |
| WO | WO03084076 A1 | 10/2003 |
| WO | WO2007063472 A2 | 6/2007 |
| WO | WO2008008714 A1 | 1/2008 |
| WO | WO2010022023 A1 | 2/2010 |

OTHER PUBLICATIONS

Bjontegaard et al., "Context-Adaptive VLC (CVLC) Coding of Coefficients," JVT-CO28, $3^{rd}$ meeting: Fairfax, VA, May 6-10, 2002, 8 pp.

Bross et al., "High efficiency video coding (HEVC) text specification draft 6" Document JCTVC-H1003, 7th Meeting: Geneva, CH, Nov. 21-30, 2011, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pp.

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross et al., "WD5: Working Draft 5 of High-Efficiency Video Coding," JCTVC-G1103_d2 7th Meeting, Geneva, Switzerland (Nov. 2011), 214 pp.

ITU-T H.264, Series H: Audiovisual and Multimedia Systems, Infrastructure of audiovisual services—Coding of moving video, Advanced video coding for generic audiovisual services, Mar. 2010, 669 pp.

ITU-T H.264, Series H: Audiovisual and Multimedia Systems, Infrastructure of audiovisual services—Coding of moving video, Advanced video coding for generic audiovisual services, Jun. 2011, 674 pp.

Karczewicz et al., "Video coding technology proposal by Qualcomm Inc.," JCTVC-A121, $1^{st}$ meeting, Dresden, DE, Apr. 15-23, 24 pp.

Karczewicz et al., "CE5: coefficient coding with LCEC for large block", 5th Meeting; Geneva,CH, JCTVC-E383, Mar. 16-23, 2011, 3 pp.

Karczewicz et al., "Improvements on VLC", Joint Collaborative Team on Video Coding of ISO/IEC JTC1 /SC29/W11 and ITU-T SG 16, No. JCTVC-C263, $3^{rd}$ meeting: Guangzhou, CN, Oct. 7-15, 2010, 5 pp.

Ugur et al., "High Performance, Low Complexity Video Coding and the Emerging HEVC Standard", IEEE Transactions on Circuits and Systems for Video Technology, vol. 20, No. 12, Dec. 2010, pp. 1688-1697.

(56) References Cited

OTHER PUBLICATIONS

Lee et al., "Efficient coefficient coding method for large transform in VLC mode", 3rd Meeting; Guangzhou, CN, JCTVC-C210, Oct. 7-15, 2010, 6 pp.
Wang et al., "Context-Based 2D-VLC Entropy Coder in AVS Video Coding Standard", Journal of Computer Science and Technology, vol. 21, No. 3, May 2006, pp. 315-322.
Schwarz et al., "Overview of the Scalable Video Coding Extension of the H.264/AVC Standard", IEEE Transactions on Circuits and Systems for Video Technology, Sep. 2007, pp. 1103-1120, vol. 17, No. 9.
Wiegand et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, Cn, Oct. 7-15, 2010, 137 pp.
Ugur et al., "Description of video coding technology proposal by Tandberg, Nokia, Ericsson", Joint Collaborative Team on Video Coding (JCT-VC) of ITU-T SG16 WP3 and ISO/IEC JTC1/SC29/WG11 1st Meeting, No. JCTVC-A119, Apr. 15-23, 2010, 33 pp.
Ugur et al., "Appendix to Description of video coding technology proposal by Tandberg, Nokia, Ericsson", Joint Collaborative Team on Video Coding (JCT-VC) of ITU-T SG16 WP3 and ISO/IEC JTC1 /SC29/ W11 1st Meeting, Dresden DE, JCTVC-A119, Apr. 15-23, 2010, 55 pp.
Wiegand et al., "WD3: Working Draft 3 of High-Efficiency Video Coding," Document JCTVC-E603, 5th Meeting: Geneva, CH, Mar. 16-23, 2011,193 pp.
Wiegand et al., "WD2: Working Draft 2 of High-Efficiency Video Coding," JCTVC-D503, Jan. 20-28, 2011, 153 pp.
Yi et al., "Low-Complexity Tools in AVS Part 7", Journal of Computer Science and Technology, May 2006, pp. 345-353, vol. 21, No. 3.
International Search Report and Written Opinion—PCT/US2012/044976—ISA/EPO—Sep. 11, 2012, 16 pp.
Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High Efficiency Video Coding (HEVC) text specification draft 9," 11th Meeting: Shanghai, CN, Oct. 10-19, 2012, JCTVC-K1003_v7, 290 pp.
Chen et al., "Comments on Generalized P and B Pictures," JCT-VC Meeting; MPEG Meeting; Jan. 20, 2011-Jan. 28, 2011; Daegu, KR; (Joint Collaborative Team on Video Coding of ITU-T SG.16 WP3 and ISO/IEC JTCI/SC29/WG11); URL: HTTP://WFTP3.ITU.INT/AV-ARCH/JCTVC-SITE/, No. JCTVC-D401, XP030008440, 4 pp.
International Preliminary Report on Patentability—PCT/US2012/044976, The International Bureau of WIPO—Geneva, Switzerland, Sep. 4, 2013, 10 pp.
Karczewicz et al., "CE5: Improved coefficient coding with LCEC," Document: JCTVC-D374, 4th Meeting: Daegu, KR, Jan. 20-28, 2011, 3 pp.
Kim et al., "Memory-Efficient H.264/AVC CAVLC for Fast Decoding," IEEE Transactions on Consumer Electornics, vol. 52, No. 3, Aug. 2006, pp. 943-952, XP002694517, IEEE USA, ISSN: 0098-3063.
Lin et al., "An Efficient Table-Merging Method for Variable Length Coding," 2007 IEEE International Conference on Electron Devices and Solid-State Circuits-EDSSC '07, 207, pp. 1179-1182, XP002694516, IEEE Piscataway, NJ, USA ISBN: 978-1-4244-0636-4.
ITU-T H.265, Series H: Audiovisual and Multimedia Systems, Infrastructure of audiovisual services—Coding of moving, Advanced video coding for generic audiovisual services, The International Telecommunication Union, Apr. 2013, 317 pp.
Second Written Opinion from International Application No. PCT/US2012/044976, dated Jun. 14, 2013, 7 pp.
"Test Model under Consideration," Joint Collaborative Team on Video Coding (JCT-VC) of ITU-T SG16 WP3 and ISO/IEC JTC1/SC29/WG11, Document: JCTVC-B205, Status: Output Document (draft000), Jul. 21-28, 2010, 152 pp.
Ugur et al., "Video coding technology proposal by Tandberg, Nokia, and Ericsson", JCT-VC Meeting; Apr. 15-23, 2010; Dresden, Joint Collaborative Team on Video Coding of ISO/IEC JTC1/SC29/WG11 and ITUTSG 16), URL: HTTP://WFTP3.1TU.INT/AV-ARCH/JCTVC-SITE/, No. XP030007562, Apr. 24, 2010, 33 pp. KP030007563, ISSN: 0000-0049.

\* cited by examiner

VLC Table Selection and Codewords

| Table VLC0 | Table VLC1 | Table VLC2 | Table VLC3 |
|---|---|---|---|
| 1 | 1x | 1xx | 1xxx |
| 01 | 01x | 01xx | 01xxx |
| 001 | 001x | 001xx | 001xxx |
| 0001 | 0001x | 0001xx | 0001xxx |
| 00001 | 00001x | 00001xx | 00001xxx |
| 000001 | 000001x | 000001xx | 000001xxx |
| 0000001 | 0000001x | 0000001xx | 0000001xxx |
| 00000001 | 00000001x | 00000001xx | 00000001xxx |
| 000000001 | 000000001x | 000000001xx | 000000001xxx |
| ... | ... | ... | ... |

FIG. 4

VLC COEFFICIENT CODING FOR LARGE CHROMA BLOCK

This application claims priority to the following U.S. Provisional Applications, the entire contents each of which is incorporated herein by reference:

U.S. Provisional Application 61/502,794, filed Jun. 29, 2011; and

U.S. Provisional Application 61/552,346, filed Oct. 27, 2011.

TECHNICAL FIELD

This disclosure relates to video coding and compression. More specifically, this disclosure is directed to techniques using variable length coding (VLC) to encode transform coefficients for one or more blocks of video data.

BACKGROUND

Entropy encoding is a method widely employed in video coding to compress video data. According to some aspects of entropy encoding, the video encoder scans a two-dimensional matrix of transform coefficients that represent pixels of an image, to generate a one-dimensional vector of the transform coefficients. In many applications, the video encoder advantageously employs the method of quantizing the transform coefficients to further compress the video data. A video decoder decodes the video data. As part of the decoding process, the video decoder scans the one-dimensional vector of transform coefficients, to reconstruct the two-dimensional matrix of transform coefficients.

The details of one or more examples are set forth in the accompanying drawings and the description below. Other features, objects, and advantages of the invention will be apparent from the description and drawings, and from the claims.

SUMMARY

In general, this disclosure describes techniques for coding video data, specifically techniques relating to scanning transform coefficients during a video coding process. In some examples, the video encoder is configured to use variable length codes (VLCs) to represent the various possible values associated with the quantized transform coefficient array generated during entropy encoding. In such instances, intermediate steps of the encoding process rely on using at least one value stored in memory. This disclosure describes methods to minimize or reduce the memory resources required in order to implement VLC coding of video data.

The details of one or more examples are set forth in the accompanying drawings and the description below. Other features, objects, and advantages of the invention will be apparent from the description and drawings, and from the claims. According to some of these examples, a dedicated coding scheme is described for chroma blocks of size greater than 8×8.

One embodiment includes a method in which a block of video data is coded by initially determining whether a block of video data is a luma block or a chroma block. If the block of video data is a luma block, a VLC table index value that is used to select a VLC table from a plurality of VLC tables based on a code number cn, and a value of a scaling factor, are both adaptively updated. On the other hand if the block of video data is a chroma block, the VLC table index value is adaptively updated based on the code number cn and the scaling factor is not used.

Another embodiment includes a processor of a computing device, or specifically an encoder or decoder, can be used to perform the method of the above example or other techniques disclosed herein. Other embodiments include computer readable media storing instructions for causing a processor to perform such methods.

BRIEF DESCRIPTION OF DRAWINGS

FIG. 4 is a table that illustrates one example of a method of coding a block of video data consistent with one or more aspects of this disclosure.

DETAILED DESCRIPTION

Figure 1:
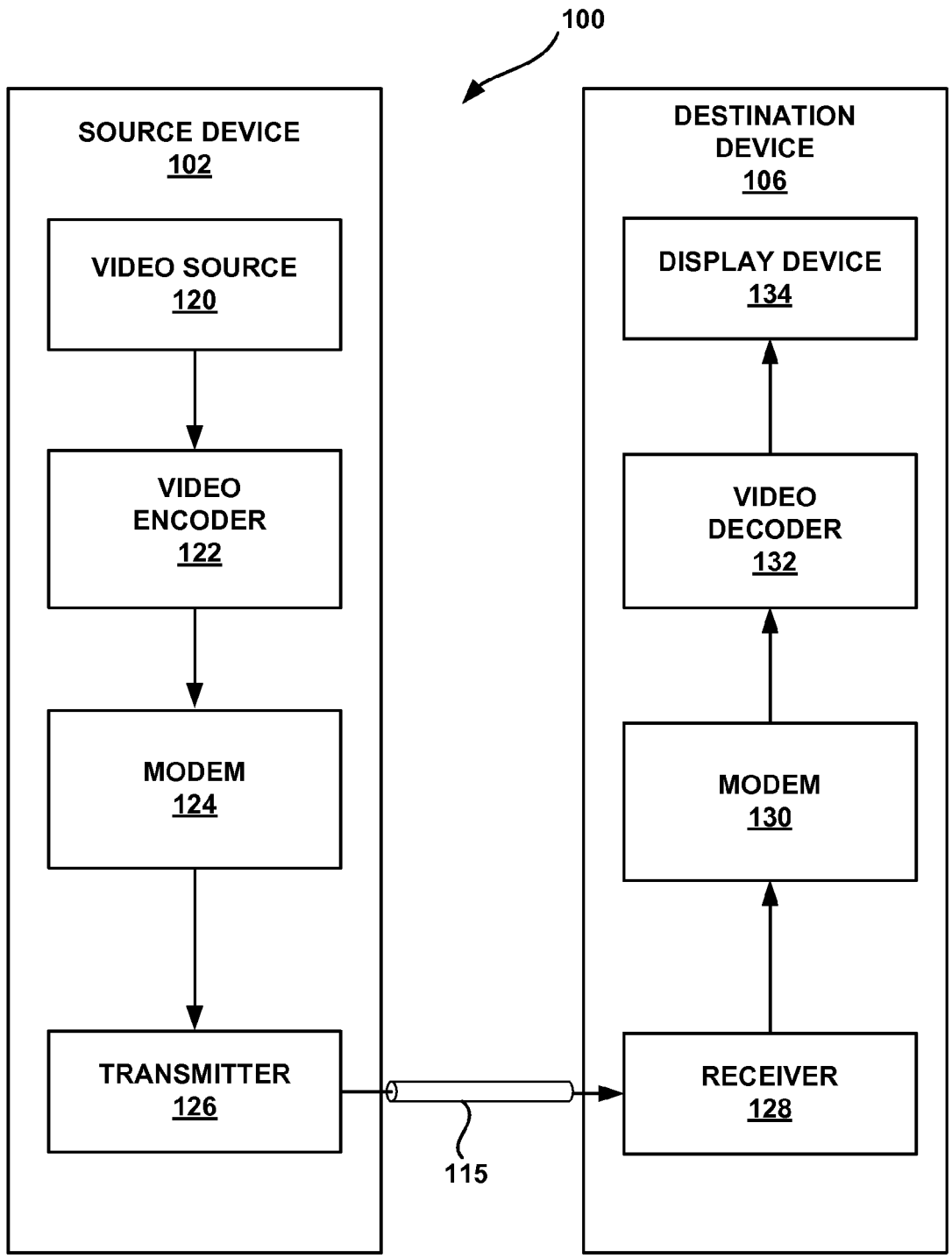
FIG. 1 is a block diagram that illustrates one example of a video encoding and decoding system configured to operate according to the techniques of this disclosure.

In general, this disclosure describes techniques for coding video data. More specifically, this disclosure describes techniques relating to scanning transform coefficients during a video coding process. Encoded video data typically includes prediction data and residual data. A video encoder produces the prediction data using an intra-prediction mode or an inter-prediction mode. Intra-prediction generally involves predicting a video block of a picture relative to neighboring, previously coded blocks of the same picture. Inter-prediction generally involves predicting a block of a picture relative to data of a previously coded picture.

Macroblocks are one type of video block defined by the ITU H.264 standard and other standards. Macroblocks typically refer to 16 by 16 blocks of data. The ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. For example, whereas ITU-T H.264 provides nine intra-prediction modes, HM provides at least thirty-four intra-prediction modes.

The emerging HEVC standard defines new terms for video blocks. In particular, with HEVC, video blocks (or partitions thereof) are permissibly referred to as "coding units." With the HEVC standard, largest coding units (LCUs) is divided into smaller and smaller coding units (CUs) according to a quadtree partitioning scheme, and the different CUs that are defined in the scheme are can be further partitioned into so-called prediction units (PUs) and/or transform units (TUs). The LCUs, CUs, and PUs, and TUs are all video blocks within the meaning of this disclosure. Other types of video blocks could potentially also be used, consistent with the HEVC standard or other video coding standards. Thus, the phrase "block" refers to any size of video block. Moreover, video blocks sometimes refer to blocks of video data in the pixel domain, or blocks of data in a transform domain such as a discrete cosine transform (DCT) domain, a domain similar to DCT, a wavelet domain, or the like. In addition, a block of data as described herein could refer to a luma block, subsampled chroma block, or both a luma block and two sub-sampled chroma blocks.

Currently in the HEVC Test Model, a dedicated coefficient coding scheme for blocks larger than 8×8 is only applied to luma blocks. For chroma blocks, there is no coefficient coding scheme available and dedicated for blocks larger than 8×8. To code a chroma block larger than 8×8, only the first 64 coefficients according to scan order in that block are kept and coded using the same coefficient coding scheme for an 8×8 block. The resultant truncation can result in loss of significant data. This disclosure describes a dedicated coding scheme for chroma blocks of size greater than 8×8, for the purpose of reducing or eliminating chroma data loss.

Following intra- or inter-prediction, a video encoder calculates a residual value for the block. The residual value generally corresponds to the difference between the predicted data for the block and the true value of the block. To further compress the residual value of a block, the residual value can be transformed into a set of transform coefficients that compact as much data (also referred to as "energy") as possible into as few coefficients as possible. The transform coefficients correspond to a two-dimensional matrix of coefficients that is the same size as the original block. In other words, there are just as many transform coefficients as pixels in the original block. However, due to the transform, many of the transform coefficients might have values equal to zero.

The video encoder often quantizes the transform coefficients to further compress the video data to reduce the amount of data needed to represent the quantized transform coefficients. Following quantization, the video encoder scans the transform coefficients, producing a one-dimensional vector from the two-dimensional matrix including the quantized transform coefficients. The video encoder optionally sets certain coefficients equal to zero prior to or following the scan.

The video encoder entropy encodes the resulting array, to even further compress the data. In some examples, the video encoder is configured to use variable length codes (VLCs) to represent various possible quantized transform coefficients of the array, e.g., using context-adaptive variable-length coding (CAVLC). In other examples, the video encoder is configured to use binary arithmetic coding to encode the resulting quantized coefficients, e.g., using context-adaptive binary arithmetic coding (CABAC). In other examples, the video encoder is configured to use Probability Interval Partitioning Entropy Codes (PIPE) to encode the resulting quantized coefficients.

This disclosure describes techniques related to scanning transform coefficients during a video coding process. The techniques are applicable to both video encoding and decoding units, including video encoder/decoders (CODECS) and processing units configured to perform video encoding and/or decoding. References to "video coding units" or "video coding devices" should be understood to refer to units or devices capable of encoding, decoding, or both encoding and decoding video data.

FIG. 1 is a block diagram illustrating an exemplary video encoding and a decoding system 100 that can be configured to implement techniques of this disclosure. As shown in FIG. 1, the system 100 includes a source device 102 that transmits encoded video to a destination device 106 via a communication channel 115. The source device 102 and the destination device 106 comprise any of a wide range of devices. In some cases, the source device 102 and the destination device 106 comprise wireless communication device handsets, such as so-called cellular or satellite radiotelephones. The techniques of this disclosure, however, which apply generally to the encoding and decoding transform coefficients of video data, are not necessarily limited to wireless applications or settings, and are potentially applicable to a wide variety of non-wireless devices that include video encoding and/or decoding capabilities.

In the example of FIG. 1, the source device 102 includes a video source 120, a video encoder 122, a modulator/demodulator (modem) 124 and a transmitter 126. The destination device 106 includes a receiver 128, a modem 130, a video decoder 132, and a display device 134. In accordance with this disclosure, the video encoder 122 of the source device 102 scans transform coefficients of a block of video data that includes a two-dimensional matrix of transform coefficients (e.g., that each corresponds to pixels of a displayed image) into a one-dimensional vector that represents the transform coefficients. According to some embodiments of this disclosure, the video encoder 122 adaptively scans a first plurality of the coefficients of the block of video data, and uses a fixed scan for a second plurality of coefficients of the block. For example, for the first plurality of transform coefficients, the video encoder 122 adaptively modifies an order in which the first plurality of transform coefficients are scanned, relative to an order in which transform coefficients of at least one previously encoded block of video data were scanned. For example, the video encoder 122 modifies the order in which transform coefficients are scanned, based on a how often coefficients at the same position in other previously encoded blocks are non-zero coefficients. For the second plurality of transform coefficients, the video encoder 122 does not adaptively modify an order in which the second plurality of transform coefficients are scanned, relative to a scan order of at least one previously encoded block of video data. Instead, the video encoder 122 scans the second plurality of coefficients using a same scan order, for a plurality of blocks of video data encoded by the encoder.

The video decoder 132 of the destination device 106 can also be configured to perform reciprocal transform coefficient decoding. Under those circumstances, the video decoder 132 maps coefficients of a one-dimensional vector of transform coefficients that represent a block of video data to positions within a two-dimensional matrix of transform coefficients, to reconstruct the two-dimensional matrix of transform coefficients.

The illustrated system 100 of FIG. 1 is merely exemplary. The transform coefficient encoding and decoding techniques of this disclosure can be performed by any encoding or decoding devices. The source device 102 and the destination device 106 are merely examples of coding devices that can support such techniques.

In this example, the video encoder 122 of the source device 102 encodes video data received from the video source 120. The video source 120 comprises a video capture device, such as a video camera, a video archive containing previously captured video, or a video feed from a video content provider. As a further alternative, the video source 120 optionally generates computer graphics-based data as the source video, or a combination of live video, archived video, and computer-generated video. In some cases, if the video source 120 is a video camera, the source device 102 and the destination device 106 form so-called camera phones or video phones. In each case, the captured, pre-captured or computer-generated video is encoded by the video encoder 122.

In the exemplary system 100, once the video data is encoded by the video encoder 122, the encoded video information is modulated by the modem 124 according to a communication standard, e.g., such as code division multiple access (CDMA) or any other communication standard or technique, and transmitted to the destination device 106 via the transmitter 126. The modem 124 includes various mixers, filters, amplifiers or other components designed for signal modulation. The transmitter 126 of this example includes circuits designed for transmitting data, including amplifiers, filters, and one or more antennas. The receiver 128 of the destination device 106 receives information over the channel 115, and the modem 130 demodulates the information. Again, the video decoding process performed by the video decoder 132 includes similar (e.g., reciprocal) decoding techniques to the encoding techniques performed by the video encoder 122.

According so some aspects of this disclosure, the communication channel 115 comprises any wireless or wired communication medium, such as a radio frequency (RF) spectrum or one or more physical transmission lines, or any combination of wireless and wired media. In such instances the communication channel 115 forms part of a packet-based network, such as a local area network, a wide-area network, or a global network such as the Internet. The communication channel 115 generally represents any suitable communication medium, or a collection of different communication media, for transmitting video data from the source device 102 to destination device 106.

Again, FIG. 1 is merely exemplary and the techniques of this disclosure are applicable to video coding settings (e.g., video encoding or video decoding) that do not necessarily include any data communication between the encoding and decoding devices. In other examples, data could be retrieved from a local memory, streamed over a network, or the like. An encoding device encodes and store data to memory, and/or a decoding device retrieves and decodes data from memory. In many cases the encoding and decoding is performed by unrelated devices that don't communicate with one another, but simply encode data to memory and/or retrieve and decode data from memory.

Although not shown in FIG. 1, in some aspects, the video encoder 122 and the video decoder 132 could each be integrated with an audio encoder and decoder, and optionally include appropriate MUX-DEMUX units, or other hardware and software, to handle encoding of both audio and video in a common data stream or separate data streams. If applicable, MUX-DEMUX units could conform to the ITU H.223 multiplexer protocol, or other protocols such as the user datagram protocol (UDP).

Either or both of the video encoder 122 and the video decoder 132 can be implemented as one or more microprocessors, digital signal processors (DSPs), application specific integrated circuits (ASICs), field programmable gate arrays (FPGAs), discrete logic, software, hardware, firmware or any combinations thereof. Each of the video encoder 122 and the video decoder 132 is potentially included in one or more encoders or decoders, either of which is potentially integrated as part of a combined encoder/decoder (CODEC) in a respective mobile device, subscriber device, broadcast device, server, or the like.

In some cases, the devices 102, 106 can be configured to operate in a substantially symmetrical manner. For example, each of the devices 102, 106 optionally includes video encoding and decoding components. Hence, the system 100 could support one-way or two-way video transmission between the video devices 102, 106, e.g., for video streaming, video playback, video broadcasting, or video telephony.

During the encoding process, the video encoder 122 executes a number of coding techniques or operations. In general, the video encoder 122 operates on video blocks within individual video frames (or other independently coded units such as slices) in order to encode the video blocks. Frames, slices, portions of frames, groups of pictures, or other data structures can be defined as independent data units that include a plurality of video blocks, and syntax elements can be included at such different independent data units. The video blocks within independent data units can have fixed or varying sizes, and possibly differ in size according to a specified coding standard. In some cases, each video frame includes a series of independently decodable slices, and each slice can additionally include one or more macroblocks or LCUs.

Referring again to FIG. 1, the video encoder 122 often performs predictive coding in which a video block being coded is compared to another block of video data in order to identify a predictive block. This process of predictive coding is often referred to as motion estimation and motion compensation. Motion estimation estimates video block motion relative to one or more predictive video blocks of one or more predictive frames (or other coding units). Motion compensation generates the desired predictive video block from the one or more predictive frames or other coding units. Motion compensation includes an interpolation process in which interpolation filtering is performed to generate predictive data at fractional pixel precision.

After generating the predictive block, the differences between the current video block being coded and the predictive block are coded as a residual block, and prediction syntax (such as a motion vector) is used to identify the predictive block. The residual block is transformed and quantized. Transform techniques optionally comprises a DCT process or conceptually similar process, integer transforms, wavelet transforms, or other types of transforms. In a DCT or DCT-like process, as an example, the transform process converts a set of pixel values (e.g., residual values) into transform coefficients, which for instance represent the energy of the pixel values in the frequency domain. Quantization is typically applied on the transform coefficients, and generally involves a process that limits the number of bits associated with any given transform coefficient.

In many embodiments, following transform and quantization, entropy coding is performed on the transformed and quantized residual video blocks. Syntax elements, various filter syntax information, and prediction vectors defined during the encoding are included in the entropy-coded bitstream. In general, entropy coding comprises one or more processes that collectively compress a sequence of quantized transform coefficients and/or other syntax information. Scanning techniques, such as fixed or adaptive scan orders, are performed on the quantized transform coefficients in order to define one or more serialized one-dimensional vectors of coefficients from two-dimensional video blocks. For example, according to the techniques described herein, both fixed and adaptive scan techniques can be used, for different coefficients of a video block. Once scanned to generate the one or more serialized one-dimensional vectors, the scanned coefficients are then entropy coded along with any syntax information.

As part of the encoding process, encoded video blocks are decoded to generate the video data used for subsequent prediction-based coding of subsequent video blocks. At this stage, filtering can be employed in order to improve video quality, and e.g., remove blockiness or other artifacts from decoded video. This filtering is optionally in-loop or post loop. With in-loop filtering, the filtering of reconstructed video data occurs in the coding loop, which means that the filtered data is stored by an encoder or a decoder for subsequent use in the prediction of subsequent image data. In contrast, with post-loop filtering, the filtering of reconstructed video data occurs out of the coding loop, which means that unfiltered versions of the data are stored by an encoder or a decoder for subsequent use in the prediction of subsequent image data.

Figure 2:
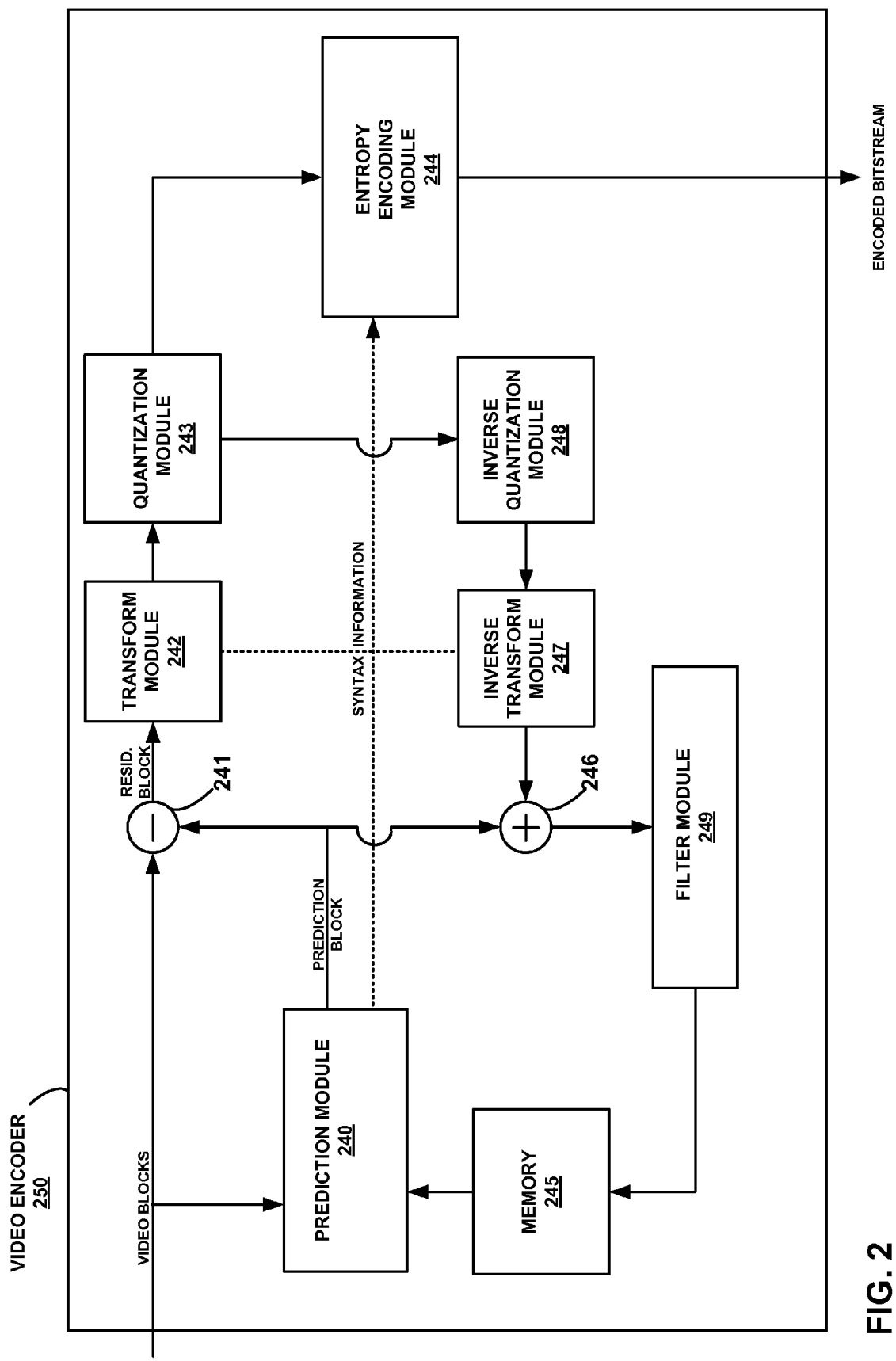
FIG. 2 is a block diagram that illustrates one example of a video encoder configured to operate according to the techniques of this disclosure.

FIG. 2 is a block diagram illustrating an example video encoder 250 consistent with this disclosure. The video encoder 250 could either correspond to the video encoder 122 of the source device 100, or a video encoder of a different device. As shown in FIG. 2, the video encoder 250 includes a prediction module 240, adders 241 and 246, and a memory 245. The video encoder 250 also includes a transform module 242 and a quantization module 243, as well as an inverse quantization module 248 and an inverse transform module 247. The video encoder 250 also includes an entropy coding module 244. The entropy coding module 244 includes a scan module 260.

During the encoding process, the video encoder 250 receives a video block to be coded, and the prediction module 240 performs predictive coding techniques. For inter coding, the prediction module 240 compares the video block to be encoded to various blocks in one or more video reference frames or slices in order to define a predictive block. For intra coding, the prediction module 240 generates a predictive block based on neighboring data within the same frame, slice, or other unit of video data. The prediction module 240 outputs the prediction block and the adder 241 subtracts the prediction block from the video block being coded in order to generate a residual block.

According to some aspects of this disclosure, for inter coding, the prediction module 240 comprises motion estimation and motion compensation modules (not depicted in FIG. 2) that identify a motion vector that points to a prediction block and generates the prediction block based on the motion vector. Typically, motion estimation is considered the process of generating the motion vector, which estimates motion. For example, the motion vector could indicate the displacement of a predictive block within a predictive frame relative to the current block being coded within the current frame. Motion compensation is typically considered the process of fetching or generating the predictive block based on the motion vector determined by motion estimation. For intra coding, the prediction module 240 generates a predictive block based on neighboring data within the same frame, slice, or other unit of video data. One or more intra-prediction modes could potentially define how an intra prediction block can be defined.

In some examples, motion compensation for inter-coding includes interpolations to sub-pixel resolution. Interpolated predictive data generated by the prediction module 240, for example, is interpolated to half-pixel resolution, quarter-pixel resolution, or even finer resolution. This permits motion estimation to estimate motion of video blocks to such sub pixel resolution.

After the prediction module 240 outputs the prediction block, and after the adder 241 subtracts the prediction block from the video block being coded in order to generate a residual block, the transform module 242 applies a transform to the residual block. The transform optionally comprises a discrete cosine transform (DCT), an integer transform, or a conceptually similar transform such as that defined by the ITU H.264 standard, the HVEC standard, or the like. In some examples, the transform module 242 performs differently sized transforms and selects different sizes of transforms for coding efficiency and improved compression. Wavelet transforms, integer transforms, sub-band transforms or other types of transforms could also be used. In any case, the transform module 242 applies a particular transform to the residual block of residual pixel values, producing a block of residual transform coefficients. The transform converts the residual pixel value information from a pixel domain to a frequency domain.

The inverse quantization module 248 and the inverse transform module 247 apply inverse quantization and inverse transform, respectively, to reconstruct the residual block in the pixel domain. The summer 246 adds the reconstructed residual block to the prediction block produced by the prediction module 240 to produce a reconstructed video block for storage in the memory 245. The filter module 249 possibly performs in-loop or post loop filtering on reconstructed video blocks.

In some examples, the memory 245 stores a frame or slice of blocks for use in motion estimation with respect to blocks of other frames to be encoded. Prior to such storage, in the case of in-loop filtering, the filter module 249 applies filtering to the video block to improve video quality. Such filtering by the filter module 249 reduces blockiness or other artifacts. Moreover, filtering improves compression by generating predictive video blocks that comprise close matches to video blocks being coded. Filtering can also be performed post-loop such that the filtered data is output as decoded data, but unfiltered data is used by the prediction module 240.

In certain examples, the quantization module 243 quantizes the residual transform coefficients (e.g., from the transform module 242) to further reduce bit rate. The quantization module 243, for example, limits the number of bits used to code each of the coefficients. After quantization, the entropy encoding module 244 scans and entropy encodes the data. For example, the entropy encoding module 244 could scan the quantized coefficient block from a two-dimensional representation to generate one or more serialized one-dimensional vectors. For example, the scan module 260 could perform a scan of a two-dimensional matrix that represents a quantized coefficient block.

Following this scanning process, the entropy encoding module 244 encodes the quantized transform coefficients (along with any syntax elements) according to an entropy coding methodology as described herein to further compress the data. In this example, syntax information included in the entropy encoded bitstream includes prediction syntax from the prediction module 240, such as motion vectors for inter coding or prediction modes for intra coding. Syntax information included in the entropy encoded bitstream possibly also includes filter information, such as that applied for interpolations by the prediction module 240 or filters applied by the filter module 249. In addition, syntax information included in the entropy coded bitstream can also includes one or more VLC code words that represent one or more of syntax elements (or other information).

Following the entropy coding by the entropy encoding module 244, the encoded video is transmitted to another device or archived for later transmission or retrieval. For example, a decoder could use a one-dimensional vector of transform coefficients of the encoded video, generated by entropy the encoding module 244, to reconstruct a two-dimensional matrix that represents a block of video data.

Figure 3:
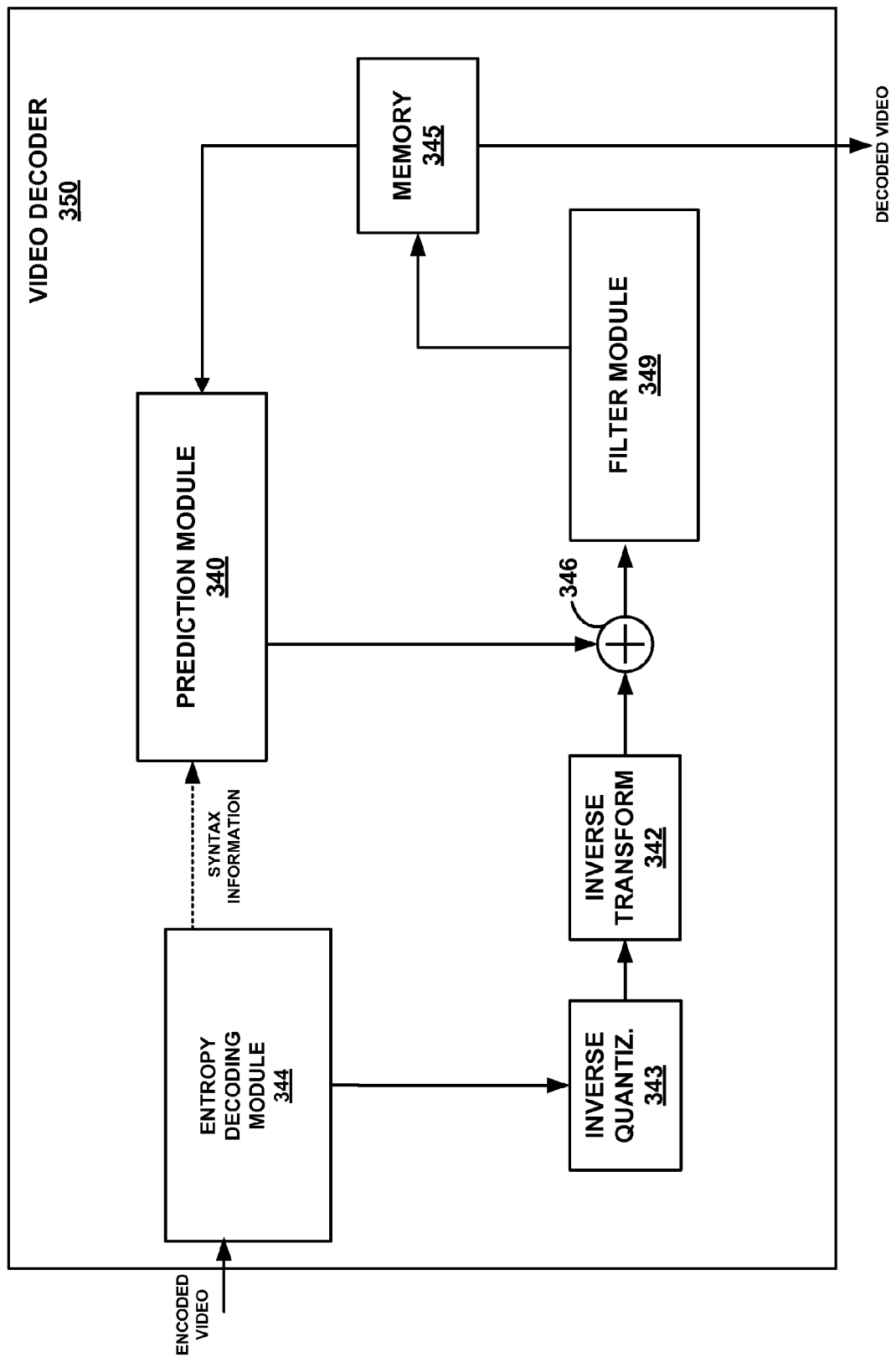
FIG. 3 is a block diagram that illustrates one example of a video decoder configured to operate according to the techniques of this disclosure.

FIG. 3 is a block diagram illustrating an example of a video decoder 350, which decodes a video sequence that is encoded in the manner described herein. The received video sequence optionally comprises an encoded set of image frames, a set of frame slices, a commonly coded group of pictures (GOPs), or a wide variety of coded video units that include encoded video blocks and syntax information to define how to decode such video blocks.

The video decoder 350 represented in FIG. 3 incorporates an entropy decoding module 344 that performs the decoding function that is the reciprocal of the encoding performed by the entropy encoding module 244 of FIG. 2. In some examples, the entropy decoding module 344 converts entropy encoded video blocks in a one-dimensional serialized format back into a two-dimensional block format. The number and size of the vectors, as well as the scan order defined for the video blocks, define how the two-dimensional block is reconstructed.

As depicted in FIG. 3, the video decoder includes a filter module 349. The filter module 349 could perform in-loop or post loop filtering on reconstructed video blocks. The video decoder 350 also includes a prediction module 340, an inverse quantization unit 343, an inverse transform module 342, a memory 345, and a summer 346.

A wide variety of video compression technologies and standards perform spatial and temporal prediction to reduce or remove the redundancy inherent in input video signals. As explained above, an input video block is predicted using spatial prediction (i.e., intra prediction) and/or temporal prediction (i.e., inter prediction or motion estimation). The prediction modules described herein generally include a mode decision module (not shown) in order to choose a desirable prediction mode for a given input video block. Mode selection considers a variety of factors such as whether the block is intra or inter coded, the prediction block size and the prediction mode if intra coding is used, and the motion partition size and motion vectors used if inter coding is used. A prediction block is subtracted from the input video block, and transform and quantization are then applied on the residual video block as described above.

The quantized coefficients, along with the mode information, can be entropy encoded to form a video bitstream. The quantized coefficients also can be inverse quantized and inverse transformed to form the reconstructed residual block, which can be added back to the prediction video block (intra predicted block or motion compensated block depending on the coding mode chosen) to form the reconstructed video block. In loop or post-loop filtration methods are applicable to reduce the visual artifacts in the reconstructed video signal. The reconstructed video block is finally stored in the reference frame buffer (i.e., memory) for use of coding of future video blocks.

In some examples, coefficients of given leaf level block of a video frame is ordered (scanned) according to a zigzag scanning technique. Such a technique is used by the encoder 250 to generate a one-dimensional ordered coefficient vector. A zig-zag scanning technique comprises beginning at an upper leftmost coefficient of the block, and proceeding to scan in a zig-zag pattern to the lower leftmost coefficient of the block.

According to a zigzag scanning technique, it is presumed that transform coefficients having a greatest energy (e.g., a greatest coefficient value) correspond to low frequency transform functions and is located towards a top-left of a block. As such, for a coefficient vector (e.g., one-dimensional coefficient vector) produced based on zigzag scanning, higher magnitude coefficients are assumed to be most likely to appear toward a start of the vector. It is also assumed that, after a coefficient vector has been quantized, most low energy coefficients will be equal to 0. In some examples, coefficient scanning is adapted during coefficient coding. For example a lower number in the scan is assigned to positions for which non-zero coefficients happen more often.

According to some examples, the encoder 250 performs an inverse zig-zag scan of transform coefficients. To perform an inverse zig-zag scan, the encoder 250 begins encoding at a location that corresponds to a last non-zero coefficient (e.g., a non-zero coefficient furthest from an upper left position of the block). Unlike the example of a zigzag scan described above, according to the example of an inverse zig-zag scan, the encoder 250 codes in a zigzag pattern from the last non-zero coefficient (i.e., in a bottom right position of the block) to an upper left position of the block. In some examples, the encoder 250 is configured to switch between a run coding mode and a level mode of coding based on a magnitude of one or more already coded coefficients.

According to an inverse zig-zag scan of transform coefficients, the encoder 250 scans a block of video data by first encoding a last_pos syntax element which indicates a last non-zero coefficient (i.e., a first non-zero coefficient of the inverse scan order). In some examples, the encoder 250 also encodes a level_ID syntax element, which indicates whether a magnitude of the last non-zero coefficient is one or greater than one. In some examples, the encoder 250 encodes the last_pos and level_ID syntax elements together as a VLC codeword.

In some examples, to code the level_ID and last_pos syntax elements, the encoder 250 determines values for the last_pos and level_ID syntax elements, and uses the determined values to determine a code number cn. The code number cn comprises an entry value that can be input into a selected VLC table of a plurality of VLC tables, to determine a VLC codeword that represents the level_ID and last_pos syntax elements. In some examples, the encoder 250 determines the code number cn based on using a mapping table of a plurality of mapping tables stored in memory, that define a relationship between the level_ID and last_pos syntax elements and the code number cn. In other examples, the encoder 250 determines the code number cn based on a structured mapping that defines the relationship between the level_ID and last_pos syntax elements and the code number cn.

As set forth in examples described above, to determine such a VLC codeword that represents level_ID and last_pos syntax elements, the encoder 250 selects a VLC table of a plurality of VLC tables stored in memory, and input the determined code number cn into the selected VLC table to determine a VLC codeword. In some examples, the encoder 250 selects the VLC table of the plurality of VLC tables based on a VLC table index value. The VLC table index value indicates which of a plurality of VLC tables the encoder 250 should use, to input the code number cn to determine the VLC codeword that represents the level_ID and last_pos syntax elements.

For example, a value vlcTableIndex could be used to represent an index of a current VLC table of an array of VLC tables. Such an array of VLC tables could be referred to as arrayVLCNum. Based on the index value vlcindex, a table of a number of VLC tables could then be represented as arrayVLCNum[vlcIndex]. As set forth in examples described above, the encoder 250 enters a code number cn into a particular table represented by the value arrayVLC-Num[vlcIndex] to code a transform coefficient.

In some examples, a plurality VLC tables stored in memory are arranged based on one or more codeword length distribution characteristics. More specifically, each of the VLC tables represents a different "rate" at which VLC codeword lengths increase in the respective VLC table. For example, the VLC mapping table of FIG. 4 illustrates one example where an encoder selects a VLC table from among four VLC tables, VLC0-VLC3.

According to the example of FIG. 4, some VLC codewords of the VLC tables VLC0-VLC3 are followed by one or more "x" symbols, each of which represents a respective length of VLC codewords within the table. For example, the VLC codeword example 1xx in VLC2 of FIG. 4 represents 4 VLC codewords associated with code numbers 0-3:
100
101
110
111

As shown in the example of FIG. 4, a rate at which the length of the respective codewords of VLC table VLC 0 increases is "faster" than a rate at which the length of the respective codewords of VLC table VLC 1 increase, which in is faster than a rate at which a length of the respective codewords of VLC table VLC 2 increase, which in turn is faster than rate at which a length of the respective codewords of VLC table VLC 3 increase. In some examples, it could be beneficial to select from among the various VLC codeword length "speeds" of VLC tables 0-3 depicted in FIG. 4, to encode last_pos and level_ID syntax elements for a block of video data.

As set forth above, in some examples, a VLC table can be selected from among a plurality of VLC tables (e.g., VLC tables 0-3 of FIG. 4) to encode last_pos and level_ID syntax elements based on a VLC table index value. In some examples, as blocks of video data are being encoded by the encoder 250, the encoder 250 updates the VLC table index value.

For example, for a luma block with a size of 16×16 or larger, and encoder can be configured to update the VLC table index value based on the following rules.

vlcTableIndex+=(cn/4==vlcTableIndex?0:(cn/4
<vlcTableIndex?-1:1));

vlcTableIndex=Min(vlcTableIndex,16);

According to this example, each time the video encoder determines a code number cn (i.e., as set forth above), and uses the code number cn to determine a VLC codeword, the encoder compares the current VLC table index value to the code number cn, divided by a scaling factor (4 in this example). If the current VLC table index value is equal to the code number cn divided by the scaling factor, the encoder 250 does not change the VLC table index value. In this example, if the current VLC table index value is greater than the code number cn divided by the scaling factor, the encoder 250 decrements (subtracts one (1) from) the VLC table index value. If the VLC table index value is less than the code number cn divided by the scaling factor, the encoder 250 increments (adds one (1) to) the VLC table index value. As also shown in the above example, the encoder 250 further compares the updated (i.e., incremented, decremented, or not changed) VLC table index value to a predetermined threshold (i.e., 16 in the above example). If the updated VLC table index value is greater than the predetermined threshold, the encoder 250 assigns a value of the predetermined threshold to the VLC table index value. In this manner, the encoder 250 keeps the VLC table index value from exceeding the predetermined threshold.

Once the encoder 250 has updated the VLC table index value as described in the example above, the encoder 250 uses the updated VLC table index value to encode (e.g., select a VLC table) last_pos and level_ID syntax elements for another block of video data (a next block of video data encoded by the encoder). Referring back to the example of FIG. 4 above, the encoder 250 uses the updated VLC table index value to select from among VLC tables 0-3. For example, if a current VLC table index value has a value of 2 (to select the VLC table in the third column of FIG. 4, table VLC2), and the VLC table index value is less than the code number cn divided by the scaling factor, the encoder 250 decrements VLC table index value to have a value of one (1). According to this example, for a next block of video data, the encoder 250 selects table VLC1 based on the decremented VLC table index value of 1.

In some examples, for luma or chroma blocks smaller than 16×16, encoder 250 uses the following rules to update a VLC table index value:

vlcTableIndex+=(cn==vlcTableIndex?0:
(cn<vlcTableIndex?-1:1));

vlcTableIndex=Min(vlcTableIndex,16);

According to this example, the encoder 250 does not compare the current VLC table index value to the code number cn divided by a scaling factor. Instead, for the luma or chroma block 8×8 or smaller, the encoder 250 compares the current VLC table index value to the code number cn itself, and update (e.g., increment, decrement, or maintain) the VLC table index value based on the comparison. As described according to the 16×16 Luma block example set forth above, the encoder 250 optionally also compares the updated (i.e., incremented, decremented, or not changed) VLC table index value to a predetermined threshold. If the updated VLC table index value is greater than the predetermined threshold, the encoder 250 can be configured to assign a value of the predetermined threshold to the VLC table index value.

According to the techniques described herein, the encoder 250 can be configured to encode luma and chroma blocks of different sizes. For example, according to the techniques described herein, for a luma block of size 8×8 or larger, the encoder 250 could update a VLC table index value based on a scaling factor. For example, the encoder could adaptively update the VLC table index value based on comparing the VLC table index value to the code number divided by the scaling factor, as described above. However, for a chroma block with a size of 8×8 or larger, the encoder does not use such a scaling factor. Instead, the encoder adaptively updates the VLC table index value based on comparing the VLC table index value to the code number, without dividing the code number by a scaling factor. In this manner, the encoder described herein can be configured to encode both luma and chroma blocks of larger size (e.g., a size greater than 8×8).

As one example, according to the techniques described herein, the following rules are used to adaptively update the value vlcTableIndex:

For a luma block with a size larger than 8×8 (i.e., 16×16, 32×32, 64×64):

vlcTableIndex+=(cn/4==vlcTableIndex?0:(cn/4
<vlcTableIndex?-1:1));

vlcTableIndex=Min(vlcTableIndex,16);

For other blocks (which include chroma block of size 16×16 or larger), vlcTableIndex+=(cn==vlcTableIndex?0:
    (cn<vlcTableIndex?−1:1));

vlcTableIndex=Min(vlcTableIndex,16);

In some examples consistent with the techniques described herein, an array of VLC tables from which an adaptively updated VLC table index value is used to select a VLC table to encode last_pos and level_ID syntax elements are dependent on block size for luma blocks, and not dependent on block size for chroma blocks. For example, for chroma blocks, the encoder 250 could use a same array of VLC tables (e.g., arrayVLCTableNum) to code last_pos and level_ID syntax elements, regardless of a size of the chroma block. According to this example, for luma blocks, different arrays of VLC tables (e.g., different arrayVLCTableNum) could be selected and used to code luma blocks, depending on a size of the respective luma block.

Figure 5:
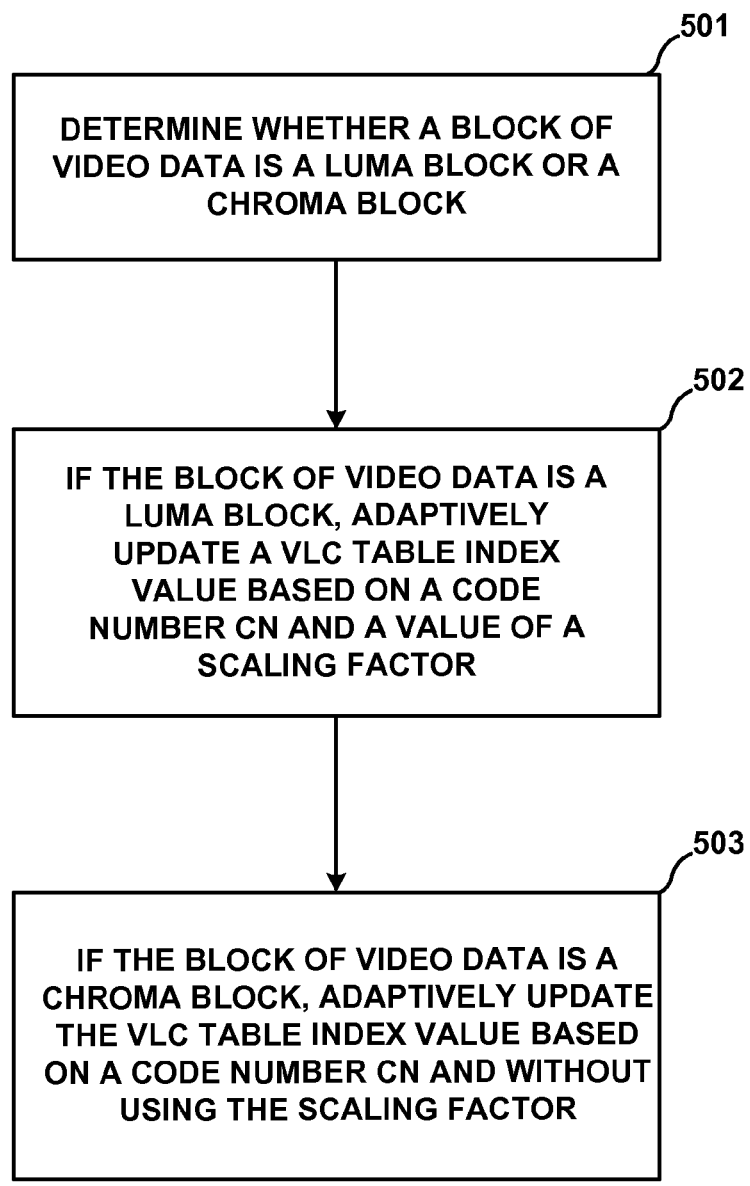
FIG. 5 is a flow diagram that illustrates one example of a method of coding a block of video data consistent with one or more aspects of this disclosure.

FIG. 5 is a flow diagram that depicts one example of a method of coding a block of video data consistent with one or more aspects of this disclosure. The method of FIG. 5 is described as performed by encoder 250 depicted in FIG. 2, to encode a block of video data. The method of FIG. 5 can be performed by any device, including the decoder 350 depicted in FIG. 3, to decode a block of video data.

As shown the example of in FIG. 5, consistent with aspects of this disclosure, the encoder 250 determines whether a block of video data is a luma block or a chroma block (501). If the block of video data is a luma block, the encoder 250 adaptively updates a VLC table index value used to select a VLC table of a plurality of VLC tables based on a code number cn and value of a scaling factor (502). If the block of video data is a chroma block, the encoder 250 adaptively updates the VLC table index value based on the code number cn and without using the scaling factor (503).

In one or more examples, the functions described herein are implemented at least partially in hardware, such as specific hardware components or a processor. More generally, the techniques can be implemented in hardware, processors, software, firmware, or any combination thereof. If implemented in software, the functions could, for example, be stored on or transmitted as one or more instructions or code on a computer-readable medium and executed by a hardware-based processing unit. Examples of computer-readable media include computer-readable storage media, which correspond to a tangible medium such as data storage media, or communication media including any medium that facilitates transfer of a computer program from one place to another, e.g., according to a communication protocol. In this manner, computer-readable media generally correspond to (1) tangible computer-readable storage media which is non-transitory or (2) a communication medium such as a signal or carrier wave. Data storage media include any available media that can be accessed by one or more computers or one or more processors to retrieve instructions, code and/or data structures for implementation of the techniques described in this disclosure. A computer program product optionally includes a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions are typically executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein can refer to any of the foregoing structure or any other structure suitable for implementation of the techniques described herein. In addition, in some aspects, the functionality described herein can be implemented within dedicated hardware and/or software modules configured for encoding and decoding, or incorporated in a combined codec. Also, the techniques could be fully implemented in one or more circuits or logic elements.

One of skill in the art will readily appreciate that the techniques of this disclosure are not limited in scope to the examples presented above, and could be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units can be combined in a codec hardware unit or provided by a collection of interoperative hardware units, including one or more processors as described above, in conjunction with suitable software and/or firmware.

Various examples been described. These and other examples are within the scope of the following claims.

The invention claimed is:

1. A method of coding luma blocks and chroma blocks of video data, comprising:
   obtain a plurality of blocks of video data;
   responsive to determining that a first block of the plurality of blocks of video data is a luma block that is greater than a threshold size, adaptively updating a variable length coding (VLC) table index value used to select a VLC table of a plurality of VLC tables based on a scaling factor and a code number that is based on a position of a last non-zero transform coefficient of the first block of video data in a scan order and whether a magnitude of the last non-zero coefficient of the first block of video data is one or greater than one;
   responsive to determining that a second block of the plurality of blocks of video data is a luma block that is not greater than the threshold size, adaptively updating the VLC table index value without using the scaling factor and based on a code number that is based on a position of a last non-zero transform coefficient of the second block of video data in the scan order and whether a magnitude of the last non-zero coefficient of the second block of video data is one or greater than one;

responsive to determining that a third block of the plurality of blocks of video data is a chroma block of any size, adaptively updating the VLC table index value without using the scaling factor and based on a code number that is based on a position of a last non-zero transform coefficient of the third block of video data in the scan order and whether a magnitude of the last non-zero coefficient of the third block of video data is one or greater than one; and encoding or decoding, based on the updated VLC table index value, a next block of the plurality of blocks of video data.

2. The method of claim 1, further comprising adaptively updating a VLC table index value used to select a VLC table of a plurality of VLC tables based on a code number and the scaling factor by at least comparing a current VLC table index value to the code number, divided by the scaling factor.

3. The method of claim 1, further comprising adaptively updating the VLC table index value based on the code number and without using the scaling factor by at least comparing the current VLC table index value to the code number.

4. The method of claim 1, wherein the threshold size is 16×16.

5. The method of claim 1 being performed by an encoder, and further comprising:
outputting by the encoder, a coded video bitstream that represents the plurality of blocks of video data.

6. The method of claim 1 being performed by a decoder, and further comprising:
receiving a coded video bitstream that represents the plurality of blocks of video data.

7. A device configured to code luma blocks and chroma blocks of video data, the device comprising:
a memory configured to store a plurality of variable length coding (VLC) tables; and
a processor configured to:
determine whether a current block of video data is a luma block or a chroma block;
responsive to determining that the current block of video data is a luma block that is greater than a threshold size, adaptively update a VLC table index value used to select a VLC table of the plurality of VLC tables based on a scaling factor and a code number that is based on a position of a last non-zero transform coefficient of the current block of video data in a scan order and whether the magnitude of the last non-zero coefficient of the current block of video data is one or greater than one;
responsive to determining that the current block of video data is a luma block that is not greater than the threshold size, adaptively update the VLC table index value based on the code number and without using the scaling factor;
responsive to determining that the current block of video data is a chroma block of any size, adaptively update the VLC table index value based on the code number and without using the scaling factor; and
encode or decode, based on the updated VLC table index value, a next block of video data.

8. The device of claim 7, the processor being further configured to adaptively update a VLC table index value used to select a VLC table of a plurality of VLC tables based on a code number and the scaling factor by at least comparing a current VLC table index value to the code number, divided by the scaling factor.

9. The device of claim 7, the processor being further configured to adaptively update the VLC table index value based on the code number and without using the scaling factor by at least comparing the current VLC table index value to the code number.

10. The device of claim 7, wherein the threshold size is 16×16.

11. The device of claim 7 being an encoder, and the processor being further configured to:
output a coded video bitstream that represents the plurality of blocks of video data.

12. The device of claim 7 being a decoder, and the processor being further configured to
receive a coded video bitstream that represents the plurality of blocks of video data.

13. A non-transitory computer-readable storage medium that stores instructions that when executed, cause a device for coding luma blocks and chroma blocks of video data to:
determine whether a current block of video data is a luma block or a chroma block;
responsive to determining that the block of video data is a luma block, adaptively update a variable length coding (VLC) table index value used to select a VLC table of a plurality of VLC tables based on a scaling factor and a code number that is based on a position of a last non-zero transform coefficient of the current block of video data in a scan order and whether the magnitude of the last non-zero coefficient of the current block of video data is one or greater than one;
responsive to determining that the current block of video data is a luma block that is not greater than the threshold size, adaptively update the VLC table index value based on the code number and without using the scaling factor;
responsive to determining that the current block of video data is a chroma block of any size, adaptively update the VLC table index value based on the code number and without using the scaling factor; and
encode or decode, based on the updated VLC table index value, a next block of video data.

14. A device configured to code chroma blocks and luma blocks of video data, the device comprising:
means for determining whether a current block of video data is a luma block or a chroma block;
means for, responsive to determining that the current block of video data is a luma block, adaptively updating a variable length coding (VLC) table index value used to select a VLC table of a plurality of VLC tables based on a scaling factor and a code number that is based on a position of a last non-zero transform coefficient of the current block of video data in a scan order and whether the magnitude of the last non-zero coefficient of the current block of video data is one or greater than one; and
means for, responsive to determining that the current block of video data is a chroma block of any size, adaptively updating the VLC table index value based on the code number and without using the scaling factor; and
means for encoding or decoding, based on the updated VLC table index value, a next block of video data.

15. The method of claim 1, the method being executable on a wireless communication device, wherein the device comprises:
- a memory a memory configured to store video data;
- a processor configured to execute instructions to process the video data stored in said memory; and
- at least one of the group consisting of:
    - a transmitter configured to output a coded video bitstream that represents the plurality of blocks of video data; and
    - a receiver configured to receive a coded video bitstream that represents the plurality of blocks of video data.

16. The method of claim 15, wherein the wireless communication device is a cellular telephone and the coded video bitstream is transmitted by the transmitter or received by the receiver and modulated according to a cellular communication standard.

17. The device of claim 7, wherein the device is a wireless communication device, the device further comprising at least one of the group consisting of:
- a transmitter configured to output a coded video bitstream that represents the plurality of blocks of video data; and
- a receiver configured to receive a coded video bitstream that represents the plurality of blocks of video data.

18. The device of claim 17, wherein the wireless communication device is a cellular telephone and the coded video bitstream is transmitted by the transmitter or received by the receiver and modulated according to a cellular communication standard.

* * * * *